May 18, 1965     A. J. BURKE ETAL     3,184,700

PATCHBOARD ASSEMBLY

Filed Dec. 29, 1961     2 Sheets-Sheet 1

INVENTOR.
ARTHUR J. BURKE
and JOHN W. AQUADRO
BY
Norris & Bateman

May 18, 1965 A. J. BURKE ETAL 3,184,700
PATCHBOARD ASSEMBLY
Filed Dec. 29, 1961 2 Sheets-Sheet 2

INVENTOR.
ARTHUR J. BURKE
and JOHN W. AQUADRO
BY
Norris & Bateman

United States Patent Office 3,184,700
Patented May 18, 1965

3,184,700
PATCHBOARD ASSEMBLY
Arthur J. Burke, Oakland, and John W. Aquadro, Wayne,
N.J., assignors to The Richardson Scale Co., Clifton,
N.J., a corporation of New Jersey
Filed Dec. 29, 1961, Ser. No. 163,145
2 Claims. (Cl. 339—18)

The present invention relates to patchboard assemblies and more particularly to improvements in patchboard structures having selectively arrangeable jumpers for making different combinations of electrical circuit connections.

In industry today, patchboard assemblies are in wide use for establishing different circuits in a programming system. These patchboard assemblies generally include a fixed terminal board to which terminal circuit connections are made from an electrical circuit and a movable patchboard carrying jumpers which are set up in different selected patterns to make multiple electrical connections with the terminal board. When the movable patchboard or jumper board is mounted in an operative position with relation to the fixed terminal board, the jumper contacts mate with the terminals on the fixed board to establish electric circuit connections for completing a predetermined circuit.

The patchboard assemblies of the foregoing type are particularly useful in programming batch weighing systems such as that disclosed in my copending application Serial No. 760,107 filed September 10, 1958. In this type of batch weighing system, desired quantities of different selected ingredients are automatically weighed for operations such as blending, bagging, compounding and the like. To obviate the necessity of manually selecting each ingredient and the weight value of each ingredient to be automatically weighed, the single patchboard assembly of the type mentioned above is used and the jumpers on the patchboard are selectively arranged to make a combination of circuit connections providing coded signals corresponding to the desired weights of the different ingredients.

Alternatively, different removable patchboards may be provided with special jumper connections permanently made so that each time a particular mixture is desired, the special movable patchboard, already prewired, may be inserted in place of another in position for use.

Perhaps the most serious shortcoming of the prior patchboard assemblies arises from the construction of the jumpers. The jumpers customarily used are of the patchcord type having two oppositely facing contact pins joined by a flexible electrical cord which comes in different lengths to bridge different distances between contact receiving holes or perforations in the movable patchboard.

As a result of this patchboard jumper construction, the wire joining the contact pins easily becomes broken through usage to disrupt the operation of the circuit.

Often, the jumper wire will fray to cause a partial break so fine that it cannot be easily detected. When frayed portions of different wires are forced into contact with each other as by enclosing the patchboard with a cover, short circuits develop to produce disturbances in the system under control. Another disadvantage of the patchcord jumper customarily used in patchboard assemblies resides in properly securing the jumpers in place so that the jumper contact pins make firm and intimate electrical contact with the terminals on the terminal board. To this end, it has been necessary to interlock the contact pins in place to prevent them from being accidentally dislodged and to assure that they are properly positioned to make intimate electrical contact with their mating terminals. The forms of interlock customarily used involve constructions providing a snap or detent action to retain the jumpers in a proper position. Such constructions, in addition to requiring the exertion of force for removing the jumpers, also increase the cost of manufacture of the article. In addition, close tolerances must be maintained to assure that the contact pins are properly positioned.

In accordance with the present invention, the necessity of interlocking the jumpers with the patchboard or the fixed terminal board is obviated by use of a special jumper having a rigid insulating crosspiece mounting the contact pins and cooperating with a patchboard cover to locate and retain the contact pins in firm intimate contact with the terminals on the terminal board. This rigid crosspiece rigidly joins the contact pins to eliminate the problems attributable to the conventional form of jumpers having exposed flexible wires joining the contact pins.

The crosspieces of the jumpers, in accordance with the present invention, are made with varying lengths for bridging different spaces and are colored in accordance with the RETMA code depending upon their lengths to enable an operator or workman to identify and select the jumper required to complete a circuit simply by its color without necessitating the measurement of the spacing between the contacts to span a given number of contact holes in the patchboard.

It is, therefore, a major object of the present invention to provide a patchboard assembly having at least one jumper of special construction non-interlockingly retained in circuit connecting position on the patchboard by means of a cover mounted over the patchboard.

A further object of the present invention resides in the provision of a novel patchboard assembly non-interlockingly carrying at least one jumper formed with a rigid crosspiece fixedly joining the jumper contact pins and co-operating with a cover mounted over the patchboard to retain the contact pins in intimate electrical contact with terminals in a fixed terminal board of the assembly.

Another object of the present invention resides in the provision of a novel patchboard assembly as in the preceding object wherein a resilient pad is carried by the cover for engagement with the rigid crosspieces of the jumper on the patchboard to compensate for variations in tolerances of the component parts of the assembly.

It is a further object of the present invention to provide for a novel jumper having an electrically insulating rigid crosspiece molded around a pair of spaced apart contact pins which are electrically interconnected by a wire embedded in the crosspiece.

Still another object of the present invention resides in the provision of a novel jumper as in the preceding object wherein the crosspieces are made with different lengths to vary the distance between contact pins for bridging different distances in an electrical circuit and wherein the different sizes of crosspieces are provided with different colors corresponding to standard code practice to enable the identification of different sized jumpers by the color of the crosspiece.

Further objects of the present invention will presently appear as the description proceeds in connection with the appended claims and the annexed drawings wherein:

Figure 1:
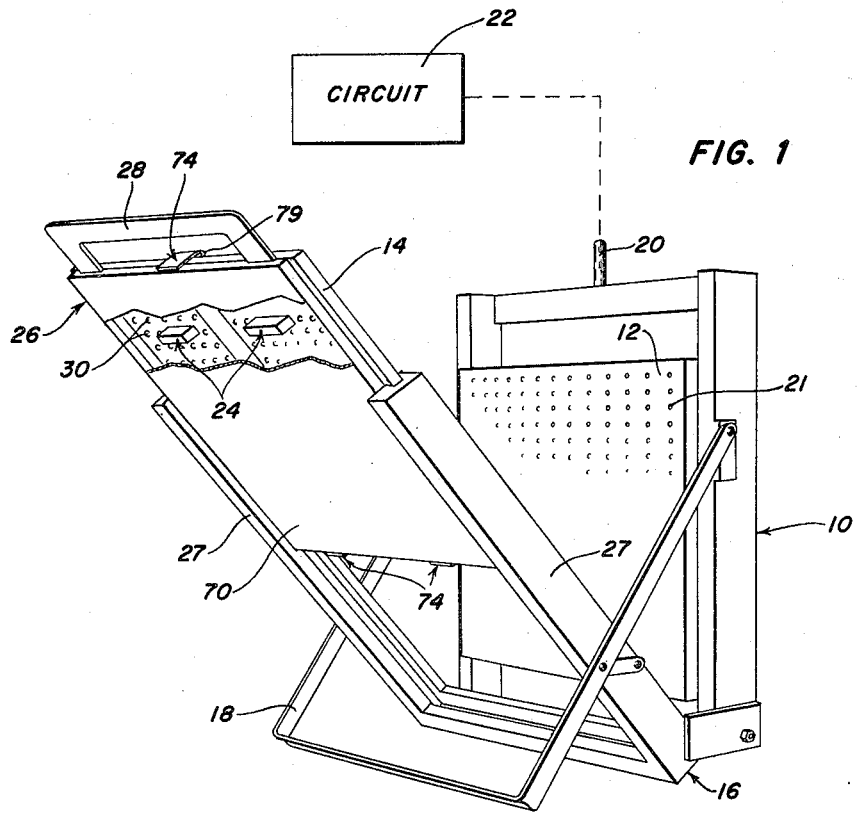
FIGURE 1 is a schematic view of a system embodying a patchboard assembly according to the present invention.
Figure 2:
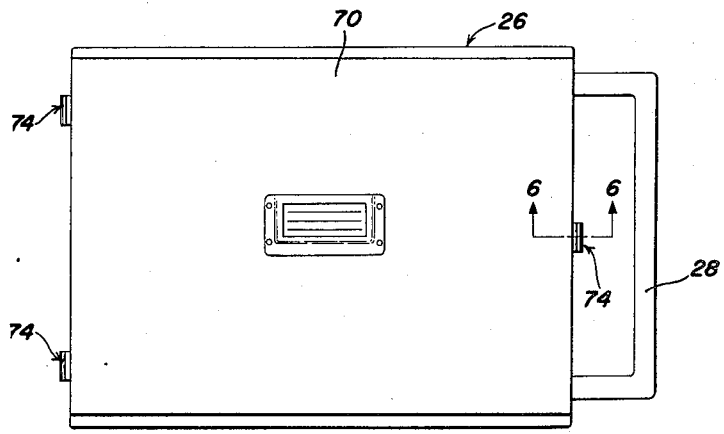
FIGURE 2 is a top plan view of the patchboard assembly illustrated in FIGURE 1.
Figure 3:
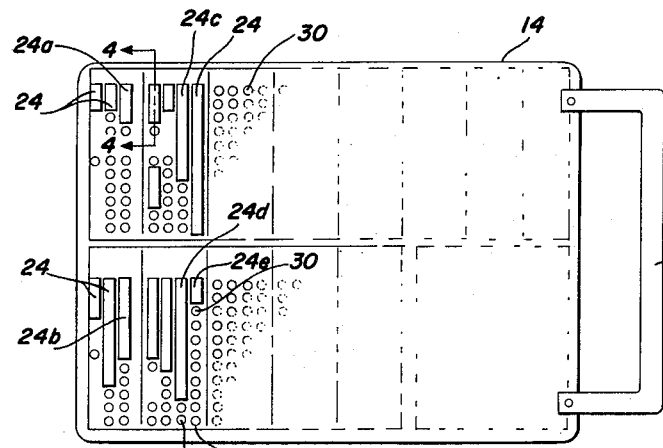
FIGURE 3 is a top plan view of the patchboard assembly illustrated in FIGURES 1 and 2 with the patchboard assembly cover removed to illustrate the patchboard and the jumpers carried by the patchboard.

Referring now to the drawings and more particularly to FIGURES 1–3, the reference numeral 10 generally designates a patchboard assembly having a fixed insulating terminal board 12 and a removable jumper or patchboard 14 shown partially inserted into a frame 16 which is hinged to enable patchboard 14 to be shifted into operative engagement with terminal board 12 through the manipulation of an operating handle 18 in the conventional manner. A cable 20 connects a series of spaced terminals 21 (FIGURES 1 and 4) in board 12 to a circuit 22. Circuit 22 may be a control and sequencing circuit for an automatic batch weighing system which auomatically weighs different selected proportions of ingredients for operations such as blending, bagging, compounding and the like as disclosed, for example, in said copending application Serial No. 760,107. The desired weight of the ingredients formulating the mixture is selected by means of a series of jumpers 24 which are arranged in a selected pattern to engage aligning terminals 21 in terminal board 12 and which are retained in place on patchboard 14 by means of a cover 26 in a manner as will presently be described.

Terminal board 12 and patchboard 14 are of conventional form with the latter being of generally rectangular shape and made from any suitable electrical insulating material such as molded phenolic to afford an insulation resistance between the multiple electrical connections established by jumpers 24. Patchboard 14 is slidably mounted in channels 27 formed by frame 16 and has a handle 28 to enable an operator to readily remove it from the frame.

Figure 4:
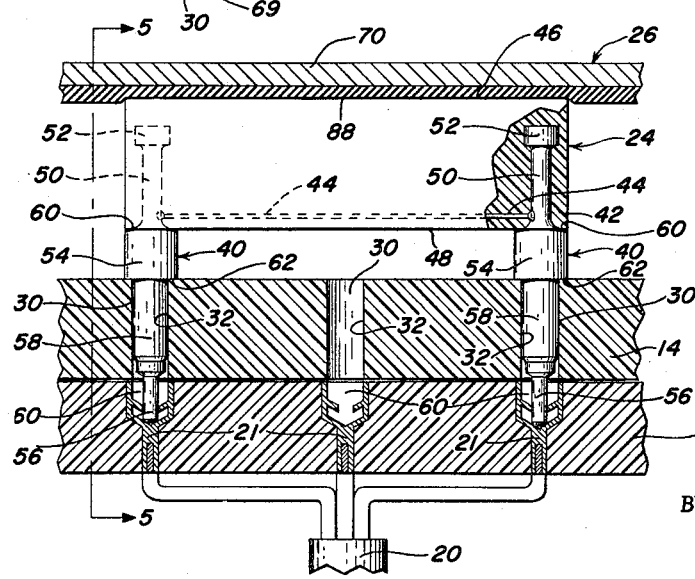
FIGURE 4 is a section taken along lines 4—4 of FIGURE 3.

As best shown in FIGURE 3, patchboard 14 is formed with parallel rows of equidistantly spaced apart contact holes 30 extending through the patchboard and each having a smooth uninterrupted cylindrical wall surface indicated at 32 in FIGURE 4. Contact holes 30 in each of the rows are preferably spaced ¼ inch on centers in accordance with the usual practice. When patchboard 14 is swung fully into operative circuit making engagement with terminal board 12 by manipulation of handle 18, contact holes 30 align with terminals 21 in terminal board 12.

Figure 5:
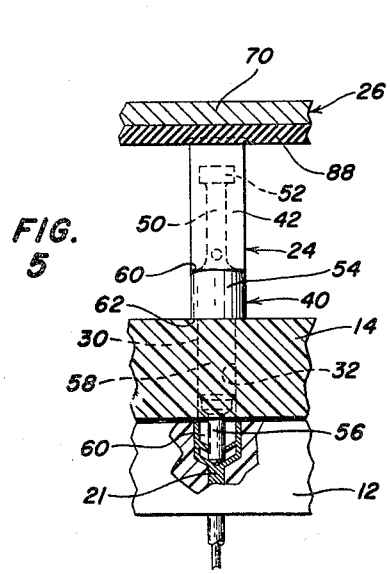
FIGURE 5 is a section taken substantially along lines 5—5 of FIGURE 4.

With reference now to FIGURES 3, 4 and 5, jumpers 24 are of the same construction but of varying size with each jumper comprising a pair of parallel spaced apart one-piece contact pins 40 fixedly joined together by a rigid crosspiece 42. Pins 40 are electrically interconnected by a wire 44 completely embedded in crosspiece 42. Crosspiece 42 is made of suitable insulating plastic material molded in place around the sub-assembly of contact pins 40 and wire 44 in the manner shown to rigidly hold pins 40 and wire 44 in place. Crosspiece 42 is formed with a rectangular cross section and smooth flat sides.

As best shown in FIGURE 4, crosspiece 42 has an outwardly directed flat surface 46 facing away from patchboard 14 and an oppositely facing inwardly directed flat surface 48 extending parallel with the surface 46 and facing toward patchboard 14. Each of the two contact pins 40 carried by crosspiece 42 is provided with a reduced diametered cylindrical shank portion 50 received in crosspiece 42 inwardly of surface 48 and terminating, at its inner end, in an enlarged cylindrically shaped anchoring head 52 which is of greater diameter than shank portion 50. Wire 44 is fixed to shank portions 50 of pins 40 as by soldering. Shank portion 50 terminates at surface 48 in an enlarged cylindrical spacer section 54 extending beyond crosspiece 42 and being joined to a cylindrically shaped terminal contact tip 56 by a cylindrical intermediate section 58. The diameter of section 58 is larger than that of contact tip 56 but smaller than spacer section 54 and is dimensioned to slidably interfit in contact holes 30.

With continued reference to FIGURES 4 and 5, section 54 forms with shank portion 50 and intermediate section 58 oppositely facing radially extending abutment shoulders 60 and 62 which respectively abut surface 48 of crosspiece 42 and the outwardly directed flat surface of patchboard 14. The longitudinal axes of pins 40 extend normal to surfaces 46 and 48 of crosspiece 42 with the crosspiece being molded around the anchoring heads 52 and shank portion 50 of both contact pins for each jumper to completely embed wire 44. By this structure, it is evident that crosspiece 42 insulates wire 44 and that the anchoring heads 52 prevent contact pins 40 from being dislodged from crosspiece 42 due to their enlarged configuration relative to shank portions 50.

In mounting each jumper 24 on patchboard 14, shoulders 62 of contact pins 40 abuttingly engage the outwardly directed surface of patchboard 14 to space crosspiece 42 outwardly from patchboard 14 with surface 48 in parallel spaced apart relation to the outwardly directed surface of patchboard 14. Intermediate sections 58 of contact pins 40 extend into contact holes 30 and terminate near the rearwardly directed surface of patchboard 14 with contact tips 56 projecting through holes 30 and into terminal recesses 60 formed in terminal board 12 for intimate contacting engagement with aligning terminals 21.

As shown in FIGURE 3, the crosspieces 42 of jumpers 24 are made with different lengths to enable contact pins 40 to be spaced apart by different predetermined distances for bridging a predetermined number of contact holes 30 in patchboard 14. By arranging different sizes of jumpers 24 on patchboard 14, different predetermined circuit connections are made with terminals 21 to vary the relationship of components in circuit 22. To illustrate the different sizes of jumpers that may be employed, the reference numerals 24a, 24b, 24c, and 24d designate jumpers having crosspieces of different lengths respectively bridging one contact hole, four contact holes, five contact holes and seven contact holes. The jumper designated by the reference character 24e has its contact pins 40 received in adjacent contact holes 30.

In order to readily distinguish different jumper sizes to thereby facilitate ready assembly and rearrangement of jumpers 24 on patchboard 14, the crosspieces 42 of different sized jumpers are colored in accordance with the RETMA code as set forth in the following table:

| Contact holes 30 bridged by jumper | Color of crosspiece 42 |
|---|---|
| None | Black. |
| One | Brown. |
| Two | Red. |
| Three | Orange. |
| Four | Yellow. |
| Five | Green. |
| Six | Blue. |
| Seven | Violet. |
| Eight | Gray. |
| Nine | White. |

The foregoing color coding system for different sizes of jumper crosspieces enables an operator or workman to set up a patchboard rapidly and expeditiously simply by choosing the proper jumper according to its color.

As disclosed in said copending application Serial No. 760,107, the arrangement of jumpers 24 on patchboard 14 sets up fixed resistance circuits which serve as the weight selection resistors, the value of which depends upon the size and location of jumpers 24 on patchboard 14. For example, the row of contact holes 30 indicated at 69 in FIGURE 3 respectively align with a row of terminals 21 on board 12. The terminal 21 aligning with the top contact hole 30 of row 69 (as viewed from FIGURE 3) may be connected to one side of a current source (not shown). Each of the terminals 21 below the top terminal then may be connected for setting up resistance circuits of different predetermined values in circuit 22 as disclosed in said copending application.

Consequently, by selecting a jumper with a white crosspiece as designated by the reference character 24e (FIGURE 3), a predetermined resistance value is operatively inserted into circuit 22 for providing a current flow of corresponding predetermined magnitude. Similarly, by replacing the jumper designated at 24e with a brown colored jumper to interconnect the terminals 21 aligning with the top contact hole 30 and the third contact hole 30 from the top in row 69, a different predetermined resistance value is operatively inserted into circuit 22 for providing a correspondingly different current magnitude. Alternatively, the jumper indicated at 24e may be replaced with any of the other sizes of jumpers mentioned in the foregoing table to provide for correspondingly different resistance values in circuit 22. In this manner, the operator, in setting up the patchboard, is able to choose the proper jumpers according to the colors of their crosspieces 42 for establishing a circuit which will automatically facilitate the weighing of desired amounts of ingredients in a given formula.

Different removable patchboards 14 may be pre-wired with special arrangements of jumpers 24 and stored for use as required instead of rearranging the jumpers on a single patchboard.

As best seen from FIGURE 4, jumpers 24 are non-interlockingly mounted on patchboard 14 with contact pins 40 being only slidably received in contact holes 30. As a result, it is evident that with this simplified form of conventional patchboard and the non-interlocking arrangement of the jumpers on the patchboard, jumpers 24 may be easily dislodged from positions on patchboard 14 where contact pins 40 establish intimate electric contact with terminals 21 in terminal board 12, thus making it very easy for undesirable circuit interruptions with consequent disturbances in circuit 22 to occur. In order to obviate this problem without providing the usual snap detent construction for retaining jumpers 24 in place, cover 26 is arranged to cooperate with all of the jumpers 24 mounted on patchboard 14 to retain them in their proper positions where the contact pins 40 make intimate electrical contact with terminals 21.

Figure 6:
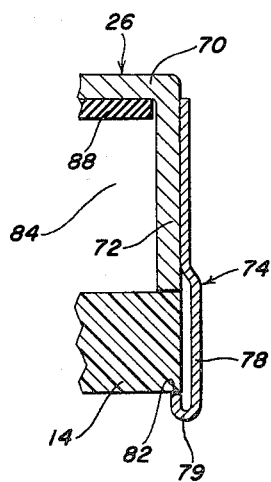
FIGURE 6 is a section taken substantially along line 6—6 of FIGURE 2.

As best shown in FIGURES 2 and 6, cover 26 is of one-piece construction and has a generally rectangular shape corresponding to that of patchboard 14. Cover 26 is formed with a top plate portion 70 and side walls 72 bent at right angles to top 70 and forming a continuous skirt extending inwardly from top 70. The bottom edges of side walls 72 abut the outwardly directed flat face of patchboard 14 in assembled relationship. To retain cover 26 in place on patchboard 14, three leaf spring clips indicated at 74 are fixedly secured to the side walls 72 of cover 26 with one clip being on the side wall adjacent handle 28 and the remaining two clips being on the oppositely facing side wall of cover 70 in the manner shown in FIGURE 2. Each spring clip 74 has a leaf spring portion formed with a straight section 78 extending inwardly from cover 26 and in spaced apart relationship along the side edge of patchboard 14. Section 78 terminates in an inwardly bent U-shaped end section 79 having an outwardly directed free edge 82 engageable with the margin edge of the rearwardly directed flat face of patchboard 14 in the manner shown. In mounting cover unit 26 on patchboard 14, cover 26 is placed over patchboard 14 with the bottom edges of side walls 72 snugly abutting the outwardly directed flat surface of patchboard 14. Spring clips 74 then are sprung into place with the edges 82 snugly abutting the inwardly directed surface of patchboard 14 such that patchboard 14 snugly extends between the bottom edges of the cover side walls 72 and the opposed edges 82 of leaf spring sections 78. Thus spring clips 74 securely mount cover 26 on patchboard 14 which, in turn, is mounted on frame 16 as hereinbefore described. By this structure, it is evident that cover 26 is secured only to patchboard 14.

As shown in FIGURES 4-6, cover 26 extends over the outwardly directed surface of patchboard 14 to form therewith a confined space indicated at 84 (FIGURE 6) in which jumpers 24 are disposed. A resilient pad 88 of substantially uniform thickness is suitably secured, as by an adhesive, to the inwardly directed surface of cover top 70 and extends substantially entirely between side walls 72. The bottom edges of side walls 72 are contained in a common plane extended substantially parallel to the inwardly directed surface of cover top 70 and the inwardly directed surface of pad 88. By this construction, the outwardly directed surface of patchboard 14 and the inwardly directed surface of cover top 70 or the inwardly directed surface of pad 88 are contained in substantially parallel spaced apart planes. Thus, the perpendicular distance between the inwardly directed surface of pad 88 in undeformed condition and the opposed outwardly directed surface of patchboard 14 is uniform and is made slightly less than the perpendicular distance between a plane containing surface 46 and a plane containing the flat annular shoulders 62 on contact pins 40. As a result, when cover 26 is mounted on patchboard 14, the outwardly directed surfaces 46 of jumpers 24 will abuttingly engage and slightly compress pad 88 so that the pressure exerted by the retention of cover 26 on patchboard 14 is uniformly applied to the crosspieces 42 of all the jumpers 24 on the patchboard. Thus, shoulders 62 of contact pins 40 are snugly held in abutment with the outwardly directed surface of patchboard 14.

Due to the resilience of pad 88, accurate tolerances are not required to be maintained to enable cover 26 to retain jumpers 24 in positions on patchboard 14 to intimately engage pins 40 with terminals 21. Variations in tolerances of cover 26, jumpers 24, patchboard 14 and terminal board 12 are compensated for by the compression of pad 88 to varying degrees to assure that jumpers 24 are snugly held in their proper connection-making positions on patchboard 14.

In preparing a circuit with patchboard assembly 10, cover 26 is first removed and jumpers 24 are arranged in selected pattern to establish multiple circuit connection for creating a desired circuit. In setting up a circuit with jumpers 24 of the present invention, the mounting of the jumpers is easily facilitated by their rigid crosspieces 42 which enable the jumpers to be easily picked up and applied to patchboard 14. Similarly, removal and rearrangement of jumpers 24 on the patchboard 14 is easily facilitated since the jumpers are only slidably mounted on patchboard 14 and are free of interlock with relation to patchboard 14. Consequently, it will be appreciated that jumpers 24 are slidably removable, requiring little or no exertion of force otherwise present with conventional snap or detent arrangements customarily used to retain the conventional forms of jumpers in position on patchboard 14.

After jumpers 24 are mounted in place on patchboard 14, cover 26 is mounted in the manner hereinbefore described to securely retain the jumpers in place, thus assuring intimate electrical circuit connections for creating a desired circuit. To allow the spring leaf portions of clips 74 to fit over and securely engage patchboard 14, all of the jumpers arranged on patchboard 14 are required to be properly positioned in place on the patchboard. If any of the jumpers are improperly positioned, such that they are not in their most inwardly directed position, the operator will not be able to secure cover 26 to patchboard 14 or, in pressing cover 26 into place, any outwardly displaced jumpers will be shifted under the pressure applied in positioning cover 26 to their proper circuit making positions.

Thus, it is apparent from the foregoing that cover 26 together with its resilient pad 88 cooperates with patch board 14 to retain jumpers 24 in their proper position for establishing intimate electrical connection between contacts 40 and terminal 21. As a result, jumpers 24 need not be interlocked in any manner with patchboard 14.

This improves the ease of mounting and removing jumper 24 with respect to patchboard 14. In addition, this feature assures that jumpers 24 are always properly positioned in circuit making position when cover 26 is mounted on patchboard 14.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:

1. In a patchboard assembly having a fixed insulating terminal panel provided with a plurality of spaced conductive terminals adapted to be connected to an electrical circuit, and a movable jumper board formed with a plurality of apertures and being selectively shiftable to an operative position in side-by-side relationship with said panel where said apertures align with said terminals, said jumper board having a substantially flat jumper mounting surface facing oppositely from said panel; a cover removably secured only to said jumper board on the side thereof opposite from said panel to form a substantially confined space with said jumper board, a resilient pad carried by said cover and being disposed in said confined space to provide a flat deformable surface facing said jumper mounting surface and extending in substantially parallel relation thereto; a plurality of jumpers mounted in a selected pattern on said jumper board and being free of interlock therewith, each of said jumpers comprising: a pair of parallel spaced apart conductive contact pins slidably extending through separate ones of said apertures for contact with aligning ones of said terminals in substantially perpendicular relationship to said jumper mounting surface, abutment shoulders on said contact pins engaging said jumper mounting surface to limit the displacement of the jumper inwardly toward said panel, a rigid insulating crosspiece bridging and fixedly joining said contact pins as a unit and being disposed in said confined space, a wire embedded in said crosspiece and electrically interconnecting said contact pins, said crosspiece having a flat surface contained in a plane extending normal to the axes of said contact pins and abuttingly engaging said resilient pad, the spacing of said surface of said pad from said jumper mounting surface being slightly less than the spacing of said surface of said crosspiece from said jumper mounting surface to enable the application of a uniformly distributed pressure to said crosspiece by mounting said cover on said jumper board for retaining each of said jumpers in place with said abutment shoulders engaging said jumper board and said contact pins intimately contacting associated ones of said terminals.

2. The patchboard assembly defined in claim 1 wherein the crosspieces of said jumpers are selectively provided with different predetermined lengths extending between said contact pins mounted therein to enable said jumpers to bridge correspondingly different distances between contact pins, the different sizes of crosspieces being provided with different coded colors to enable the identification of the different sizes solely by the color of each crosspiece.

References Cited by the Examiner

UNITED STATES PATENTS

| | | | |
|---|---|---|---|
| 789,574 | 5/05 | Steinberger | 339—218 |
| 1,784,236 | 12/30 | Jones | 339—113 X |
| 2,286,812 | 6/42 | Keefe | 339—61 X |
| 2,396,872 | 3/46 | Miller et al. | 339—91 X |
| 2,482,998 | 9/49 | Andersson | 339—18 |
| 2,714,194 | 7/55 | Beynink | 339—18 |
| 2,738,482 | 3/56 | Benander | 339—19 X |
| 2,922,135 | 1/60 | Hoberg et al. | 339—18 |
| 3,004,235 | 10/61 | Cohen et al. | 339—18 |

JOSEPH D. SEERS, *Primary Examiner.*

THOMAS J. HICKEY, *Examiner.*